US 12,555,631 B2

(12) United States Patent
Chinthu et al.

(10) Patent No.: US 12,555,631 B2
(45) Date of Patent: Feb. 17, 2026

(54) WORD LINE DRIVER INCLUDING WORD LINE VOLTAGE-CONTROLLED PROTECTION TRANSISTOR

(71) Applicant: GlobalFoundries U.S. Inc., Malta, NY (US)

(72) Inventors: Siva Kumar Chinthu, Bangalore (IN); Venkatesh Periyapatna Gopinath, Fremont, CA (US); Suresh Pasupula, Andhra Pradesh (IN); Sangeeta Menon, Bangalore (IN)

(73) Assignee: GlobalFoundries U.S. Inc., Malta, NY (US)

( * ) Notice: Subject to any disclaimer, the term of this patent is extended or adjusted under 35 U.S.C. 154(b) by 108 days.

(21) Appl. No.: 18/734,404

(22) Filed: Jun. 5, 2024

(65) Prior Publication Data

US 2025/0378876 A1    Dec. 11, 2025

(51) Int. Cl.
*G11C 11/34* (2006.01)
*G11C 11/418* (2006.01)
(Continued)

(52) U.S. Cl.
CPC ...... *G11C 13/0028* (2013.01); *G11C 13/0038* (2013.01); *G11C 7/222* (2013.01);
(Continued)

(58) Field of Classification Search
CPC ............ G11C 13/0028; G11C 13/0038; G11C 11/418; G11C 11/419; G11C 7/222; G11C 8/05
(Continued)

(56) References Cited

U.S. PATENT DOCUMENTS

| 6,535,430 B2* | 3/2003 | Ogura ............ G11C 8/10 365/189.11 |
| 8,120,968 B2 | 2/2012 | Reohr et al. |

(Continued)

OTHER PUBLICATIONS

Pashmineh et al., "Design of a High-Voltage Driver based on Low-Voltage CMOS with an Adapted Level Shifter optimized for a Wide Range of Supply Voltage," In Dec. 2015 IEEE International Conference on Electronics, Circuits, and Systems (ICECS), 4 pages.
(Continued)

*Primary Examiner* — Ly D Pham
(74) *Attorney, Agent, or Firm* — David Cain; Hoffman Warnick LLC (57) ABSTRACT

A word line driver includes all low voltage transistors including a low voltage, word line voltage-controlled, protection transistor. The word line driver receives input signals including: a first power supply signal that toggles between a programmable first voltage and a first voltage-dependent second voltage; an input voltage signal that toggles between the second voltage and the first voltage; a second power supply signal at the second voltage; a third power supply signal at a first voltage-dependent third voltage; and a fourth power supply signal at a fixed fourth voltage. In response, the word line driver outputs a word line voltage signal that toggles between the first voltage and ground. The particular voltage levels of the input signals in combination with the inclusion of the protection transistor prevent safe operating area violations.

20 Claims, 5 Drawing Sheets (51) Int. Cl.
  *G11C 11/419* (2006.01)
  *G11C 13/00* (2006.01)
  *G11C 7/22* (2006.01)
  *G11C 8/08* (2006.01)

(52) U.S. Cl.
  CPC .............. *G11C 8/08* (2013.01); *G11C 11/418* (2013.01); *G11C 11/419* (2013.01)

(58) Field of Classification Search
  USPC .................................................... 365/230.06
  See application file for complete search history.

(56) References Cited

U.S. PATENT DOCUMENTS

| | | | |
|---|---|---|---|
| 9,881,669 B1* | 1/2018 | Bringivijayaraghavan | ................. G11C 11/418 |
| 2005/0088903 A1* | 4/2005 | Dono | ........................ G11C 8/14 365/230.06 |
| 2014/0169117 A1* | 6/2014 | Masleid | ................... G11C 8/10 365/230.06 |
| 2014/0269140 A1 | 9/2014 | Sanjeevarao et al. | |
| 2017/0169874 A1 | 6/2017 | Dray et al. | |
| 2022/0068353 A1 | 3/2022 | Katoch | |
| 2022/0101934 A1 | 3/2022 | Sanjeevarao et al. | |
| 2023/0162789 A1 | 5/2023 | Dagan | |
| 2024/0321374 A1* | 9/2024 | Sato | ........................ G11C 16/10 |

OTHER PUBLICATIONS

European Search Report for corresponding EP Application No. 24217329.2-1218 dated Apr. 4, 2025, 10 pages.

\* cited by examiner

FIG. 1

Table of V1, V2, V3 and V4 levels for a word line driver including all 1.8V-rated transistors having a 1.98V VGSmax, a 1.98V VGDmax, and a 1.98V VSDmax

| V1 (Programmable) | V2 (V1-Dependent) | V3 (V1-Dependent) | V4 (Fixed) |
|---|---|---|---|
| 1.2V – 1.8V | 0.0V | 0.8V | 1.8V |
| >1.8V – 2.6V | 0.8V | 1.8V | 1.8V |
| >2.6V – 3.0V | 1.3V | 1.8V | 1.8V |
| > 3.0V and up to 3.6V | 1.8V | 1.8V | 1.8V |
| VDDW (READ) | 0.0V | 1.8V | 1.8V |

WORD LINE DRIVER INCLUDING WORD LINE VOLTAGE-CONTROLLED PROTECTION TRANSISTOR

BACKGROUND

The present disclosure relates to word line drivers in peripheral circuitry of memory devices and, more particularly, to embodiments of a programmable high voltage word line driver including low voltage transistors.

Considerations in modern integrated circuit (IC) design include, but are not limited to, performance improvement, size scaling, and power consumption. Oftentimes design changes to improve one aspect of an IC can yield an undesirable trade-off with respect to other aspects of the IC. For example, a word line driver in a memory device, such as a resistive random-access memory (RRAM) device, may be configured to switch a word line voltage signal from ground (e.g., 0.0V) to a programmable high word line voltage (e.g., 3.6V) during write or read operations. Designs for such word line drivers have been developed that include low voltage transistors to reduce power consumption. However, at least some of the low voltage transistors in these high voltage word line drivers tend to quickly operate outside their safe operating areas (SOAs). Design modifications intended to avoid SOA violations have included, for example, the use of asymmetric high voltage transistors (e.g., laterally diffused metal oxide semiconductor field effect transistors (LDMOSFETs)) in place of at-risk low voltage transistors and/or the use of static bias circuits. However, these design modifications typically add to circuit complexity, power consumption, and area.

SUMMARY

Disclosed herein are embodiments of a word line driver structure. The word line driver can include a group of series-connected transistors between a first power supply node and ground. This group of series-connected transistors can include at least a first P-type transistor, a second P-type transistor, and a first N-type transistor. The word line driver can further include an intermediate node between the first P-type transistor and the second P-type transistor and a word line voltage output node between the second P-type transistor and the first N-type transistor. The word line driver structure can further include a third P-type transistor (also referred to herein as a protection transistors), which is connected between a second power supply node and the intermediate node and which has a gate connected to the word line voltage output node.

In some embodiments, the word line driver can include a group of series-connected transistors between a first power supply node and ground. This group of series-connected transistors can include at least a first P-type transistor, a second P-type transistor, and a first N-type transistor. The word line driver can further include an intermediate node between the first P-type transistor and the second P-type transistor and a word line voltage output node between the second P-type transistor and the first N-type transistor. The word line driver can further include a third P-type transistor connected between a second power supply node and the intermediate node. A gate of the first P-type transistor can be connected to an input voltage node. A gate of the second P-type transistor is connected to the second power supply node. A gate of the third P-type transistor is connected to the word line voltage output node. In these embodiments, the first power supply node can be connected to receive a first power supply signal that switches between a first voltage that is programmable and a second voltage that is dependent on and lower than the first voltage. The input voltage node can be connected to receive an input signal that switches between the second voltage and the first voltage. The second power supply node can be connected to receive a second power supply signal at the second voltage. The word line voltage output node outputs a word line voltage signal that switches between the first voltage and ground.

Also disclosed herein are embodiments of a memory structure with peripheral circuitry that includes multiple word line drivers, as described above. The memory structure can include a memory array with multipole rows of memory cells and word lines connected to the rows, respectively. The memory structure can further include peripheral circuitry and the peripheral circuitry can include word line drivers connected to the word lines, respectively. Each word line driver can include a group of series-connected transistors between a first power supply node and ground. This group of series-connected transistors can include at least a first P-type transistor, a second P-type transistor, and a first N-type transistor. The word line driver can further include an intermediate node between the first P-type transistor and the second P-type transistor and a word line voltage output node between the second P-type transistor and the first N-type transistor and connected to a word line for a row. The word line driver can further include a third P-type transistor (also referred to herein as a protection transistor), which is connected between a second power supply node and the intermediate node and which has a gate connected to the word line voltage output node.

It should be noted that all aspects, examples, and features of disclosed embodiments mentioned in the summary above can be combined in any technically possible way. That is, two or more aspects of any of the disclosed embodiments, including those described in this summary section, may be combined to form implementations not specifically described herein. The details of one or more implementations are set forth in the accompanying drawings and the description below. Other features, objects and advantages will be apparent from the description and drawings, and from the claims.

BRIEF DESCRIPTION OF THE DRAWINGS

The present disclosure will be better understood from the following detailed description with reference to the drawings, which are not necessarily drawn to scale and in which.

DETAILED DESCRIPTION

As mentioned above, considerations in modern integrated circuit (IC) design include, but are not limited to, performance improvement, size scaling, and power consumption. Oftentimes design changes to improve one aspect of an IC can yield an undesirable trade-off with respect to other aspects of the IC. For example, a word line driver in a memory, such as an RRAM, may be configured to switch a word line voltage signal from ground (e.g., 0.0V) to a programmable high word line voltage (e.g., 3.6V) during write or read operations. Designs for such word line drivers have been developed that include low voltage transistors to reduce power consumption. However, at least some of the low voltage transistors in these high voltage word line drivers tend to quickly operate outside their safe operating areas (SOAs). Design modifications intended to avoid SOA violations have included, for example, the use of asymmetric high voltage transistors (e.g., laterally diffused metal oxide semiconductor field effect transistors (LDMOSFETs)) in place of at-risk low voltage transistors and/or the use of static bias circuits. However, these design modifications typically add to circuit complexity, power consumption, and area.

In view of the foregoing, disclosed herein are embodiments of a word line driver with all low voltage transistors including, but not limited to, a low voltage, word line voltage-controlled, protection transistor. The word line driver is specifically configured to receive various input signals including, but not limited to: a first power supply signal that toggles between a programmable first voltage that is relatively high (when the word line driver is selected) and a first voltage-dependent second voltage that is relatively low (when the word line driver is not selected); an input signal that toggles between the second voltage (when the word line driver is selected) and the first voltage (when the word line driver is not selected); a second power supply signal at the second voltage; a third power supply signal at a first voltage-dependent third voltage that is also relatively low; and a fourth power supply signal at a fixed fourth voltage (e.g., corresponding to the voltage rating of the transistors). In response to these input signals, the word line driver outputs a word line voltage signal to a word line. The word line voltage signal specifically toggles between the first voltage (when the word line driver is selected) and ground (Gnd) (when the word line driver is not selected). As discussed in greater detail below, the first voltage is programmable (e.g., depending upon the operation to be performed) and the first voltage-dependent second and third voltages along with the word line voltage-controlled protection transistor are employed to ensure that, despite variations in the first voltage, all transistors of the word line driver continuously operate within a specified safe operating area (SOA) without significantly adding to circuit complexity, power consumption, or area.

Figure 1:
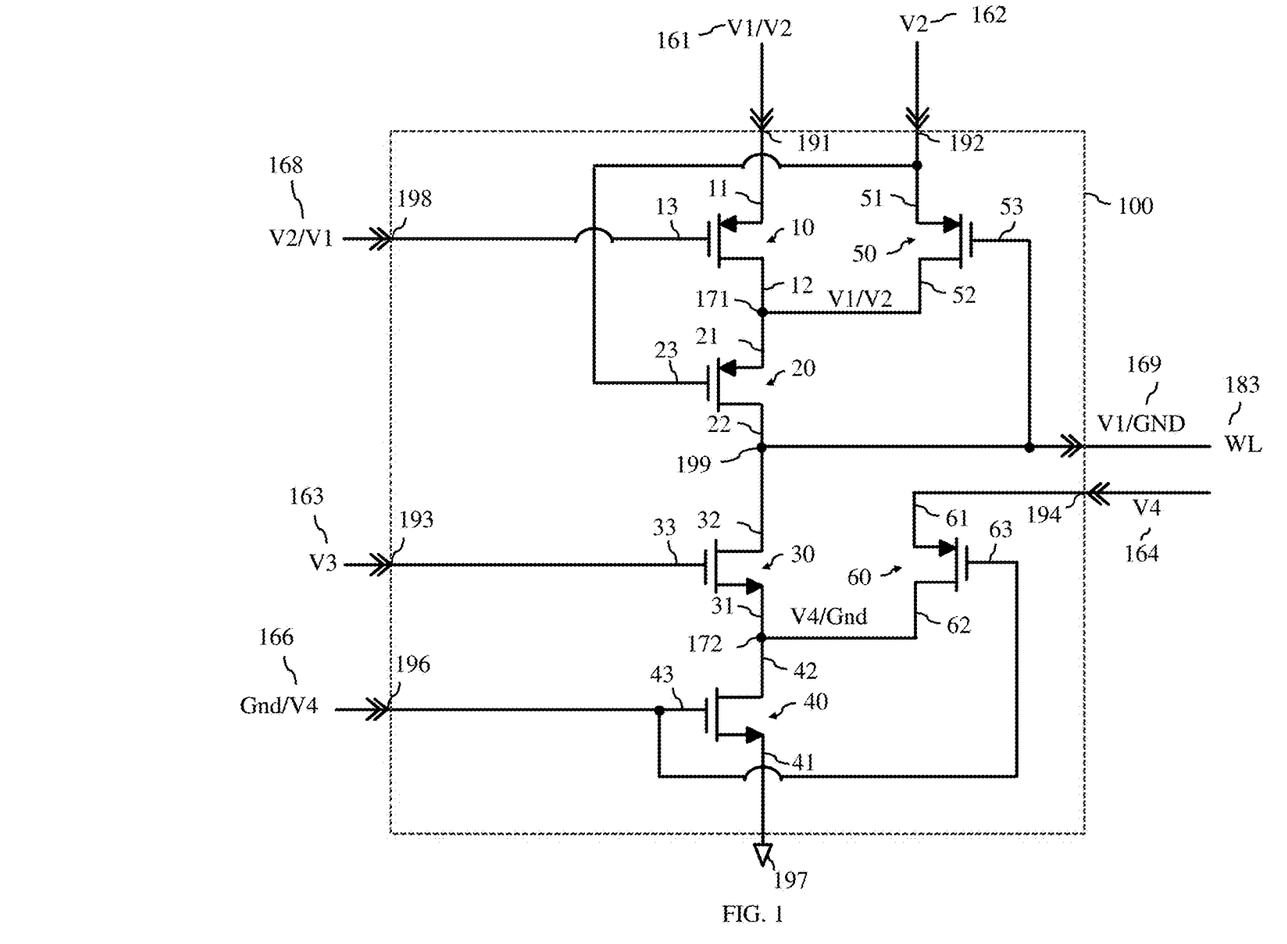
FIG. 1 is a schematic diagram illustrating disclosed embodiments of a word line driver.

More particularly, FIG. 1 is a schematic diagram illustrating a disclosed embodiment of a word line driver 100. Word line driver 100 can include a group of series-connected transistors between a first power supply node 191 and ground (e.g., at 0.0 volts (V)). This group of series-connected transistors can include a first P-type field effect transistor (PFET) 10, a second PFET 20, a first N-type field effect transistor (NFET) 30, and a second NFET 40.

First PFET 10 can include: a source region 11, which is electrically connected to first power supply node 191; a drain region 12; a channel region between the source and drain regions 11-12; and a gate 13 adjacent to the channel region. Second PFET 20 can include: a source region 21, which is electrically connected to drain region 12 of first PFET 10 at an intermediate node 171; a drain region 22; a channel region between the source and drain regions 21-22; and a gate 23 adjacent to the channel region. Optionally, source region 21 and drain region 12 can be a shared source/drain region.

First NFET 30 can include: a drain region 32, which is electrically connected to drain region 22 of second PFET 20 (e.g., via one or more interconnects); a source region 31; a channel region between the source and drain regions 31-32; and a gate 33 adjacent to the channel region. Second NFET 40 can include: a drain region 42, which is electrically connected to source region 31 of first NFET 30 at an additional intermediate node 172; a source region 41 electrically connected to ground 197; a channel region between the source and drain regions 41-42; and a gate 43 adjacent to the channel region. Optionally, drain region 42 and source region 31 can be a shared source/drain region.

An output node 199 of word line driver 100 (referred to herein as the word line voltage output node) can be located at an interconnect between and connecting drain region 22 of second PFET 20 and drain region 32 of first NFET 30. For example, drain region 22 of second PFET 20 and drain region 32 of first NFET 30 can be electrically connected at word line voltage output node 199. Word line voltage output node 199 can further be electrically connected to a word line (WL) 183.

Additionally, gate 13 of first PFET 10 can be electrically connected to an input voltage node 198. Gate 23 of second PFET 20 can be electrically connected to a second power supply node 192. Gate 33 of first NFET 30 can be electrically connected to a third power supply node 193. Finally, gate 43 of second NFET 40 can be electrically connected to word line driver select node 196.

Word line driver 100 can further include a pair of protection transistors included to, at least in part, prevent SOA violations regardless of variations in the first voltage, as discussed in greater detail below. These protection transistors can include a third PFET 50 (also referred to herein as a word line voltage-controlled protection transistor). Third PFET 50 can be electrically connected between second power supply node 192 and intermediate node 171. That is, third PFET 50 can include: a source region 51, which is electrically connected to second power supply node 192 and a drain region 52, which is electrically connected to intermediate node 171. Third PFET 50 can further include: a channel region between source and drain regions 51-52; and a gate 53 adjacent to the channel region. Gate 53 of third PFET 50 can specifically be electrically connected to word line voltage output node 199 so that the third PFET 50 is word line voltage-controlled. The protection transistors can further include a fourth PFET 60 (also referred to herein as an additional protection transistor). Fourth PFET 60 can be electrically connected between a fourth power supply node 194 and additional intermediate node 172, which, as mentioned above, is at the junction between first NFET 30 and second NFET 40 (e.g., at the share source/drain region 31/42). That is, fourth PFET 60 can include: a source region 61, which is electrically connected to fourth power supply node 194; and a drain region 62, which is electrically connected to additional intermediate node 172. Fourth PFET 60 can further include: a channel region between source and drain regions 61-62; and a gate 63 adjacent to the channel region. Gate 63 of fourth PFET 60 can, like gate 43 of second NFET 40, be electrically connected to word line driver select node 196.

All of the transistors within word line driver 100, including the protection transistors, can be low voltage transistors for reduced power consumption. For example, transistors 10, 20, 30, 40, 50, and 60 can all be 1.8V-rated transistors, 1.5V-rated transistors or transistors with some other relatively low voltage rating. In any case, those skilled in the art will recognize that field effect transistors typically have a technology-specified safe operating area (SOA). The technology-specified SOA includes several maximum operating voltage conditions including, but not limited to, gate-source voltage (VGSmax), gate-drain voltage (VGDmax), and source-drain voltage (VSDmax). Transistors 10, 20, 30, 40, 50, and 60 can be symmetric transistors with VGSmax, VGDmax, and VSDmax of these transistors being equal. For example, if the transistors are 1.8V-rated transistors, VGSmax, VGDmax, and VSDmax could all be approximately 1.8V plus 10%) (e.g., no greater than 1.98V). If the transistors are 1.5V-rated transistors, VGSmax, VGDmax, and VSDmax could all be approximately 1.5V plus 10% (e.g., no greater than 1.65V), and so on.

Within word line driver 100, first PFET 10 and second PFET 20 can optionally be same-size transistors. That is, first PFET 10 and second PFET 20 can have essentially the same channel width (e.g., channel widths differing by no more than plus or minus 10%) and essentially the same channel length (e.g., channel lengths differing by no more than plus or minus 10%). In some embodiments, first PFET 10 and second PFET 20 can have an approximately 10,000 nanometer (nm) channel width and an approximately 150 nm channel length. Similarly, within word line driver 100, first NFET 30 and second NFET 40 can optionally be same-size transistors. That is, first NFET 30 and second NFET 40 can have essentially the same channel width (e.g., channel widths differing by no more than plus or minus 10%) and essentially the same channel length (e.g., channel lengths differing by no more than plus or minus 10%). Additionally, first NFET 30 and second NFET 40 can be somewhat smaller than the first PFET 10 and second PFET 20. In some embodiments, first NFET 30 and second NFET 40 can have an approximately 5000 nm channel width and an approximately 150 nm channel length. Finally, within word line driver 100, third PFET 50 and fourth PFET 60 can optionally be same-size transistors. Additionally, third PFET 50 and fourth PFET 60 can be significantly smaller than the other transistors. In some embodiments, third PFET 50 and fourth PFET 60 can have an approximately 200 nm channel width and an approximately 150 nm channel length.

Word line driver 100 can be connected to receive various input signals (e.g., from peripheral circuitry within a memory device, as discussed in greater detail below). These input signals can include, but are not limited to: a first power supply signal 161 at first power supply node 191; a second power supply signal 162 at second power supply node 192; a third power supply signal 163 at third power supply node 193; a fourth power supply signal 164 at fourth power supply node 194; an input voltage signal 168 at input voltage node 198; and a word line driver select signal 166 (hereinafter referred to as select signal) at word line driver select node 196.

Select signal 166 can switch from high to low, when word line driver 100 is selected to activate WL 183 connected thereto. Activation of WL 183 refers to switching of word line voltage signal 169 on word line voltage output node 199 from ground (e.g., 0.0V) to a programmable first voltage (V1) in order to access one or more memory cells connected to the WL for performance of a write or read operation. Select signal 166 will switch from low back to high, when word line driver 100 is not selected (i.e., when activation of the WL is no longer necessary).

First power supply signal 161 on first power supply node 191 can toggle between a programmable first voltage (V1) when word line driver 100 is selected and a first voltage-dependent second voltage (V2) when word line driver 100 is not selected. As discussed in greater detail below, programming of V1 can be employed so that the word line voltage signal 169 achieves a particular operation-dependent high voltage level during activation of WL 183.

Second power supply signal 162 on second power supply node 192 can remain steady at V2, which, as mentioned above, can be variable depending upon the programmed state of V1. Specifically, V2 can be lower than and dependent on V1. Third power supply signal 163 on third power supply node 193 can be at a first voltage-dependent third voltage (V3). That is, third power supply signal 163 can remain steady at V3, which is also variable depending upon the programmed state of V1. Specifically, V3 can be lower than and dependent on V1. Fourth power supply signal 164 on fourth power supply node 194 can be at a fixed fourth voltage (V4). That is, V4 can remain constant at a particular voltage level regardless of changes in V1, V2, or V3. V4 can, for example, be equal to the voltage rating of the transistors 10, 20, 30, 40, 50 and 60. For example, if the transistors 10, 20, 30, 40, 50 and 60 are 1.8V-rated transistors, V4 can be fixed at 1.8V.

Finally, input voltage signal 168 on input voltage node 198 can toggle between V2 when word line driver 100 is selected and V1 when the word line driver 100 is not selected.

As mentioned above select signal 166 toggles between a low voltage level when word line driver 100 is selected and a high voltage level when word line driver 100 is not selected. The low voltage level of select signal 166 can be at ground (e.g., 0.0V) and the high voltage level of select signal 166 can be at V4 (e.g., 1.8V for 1.8V-rated transistors).

When word line driver 100 is selected (i.e., when select signal 166 is at ground, first power supply signal 161 is at V1, and input voltage signal 168 is at V2), an output word line voltage signal 169 output on word line voltage output node 199 can switch to V1 (i.e., the programmable first voltage). When word line driver 100 is no longer selected (i.e., when select signal 166 switches to V4, first power supply signal 161 switches to V2, and input voltage signal 168 switches to V1), output word line voltage signal 169 output on word line voltage output node 199 will be at ground. As discussed in greater detail below, the voltage levels of the various input signals received by word line driver 100 (e.g., from peripheral circuitry and/or power supply system of a memory device) and the presence of the protection transistors (including third PFET 50, which is word line voltage-controlled, and fourth PFET 60) ensure that all transistors of the word line driver 100 continuously operate without violation of VGSmax, VSDmax, and VGDmax and without significantly adding to circuit complexity, power consumption, or area.

Figure 2:
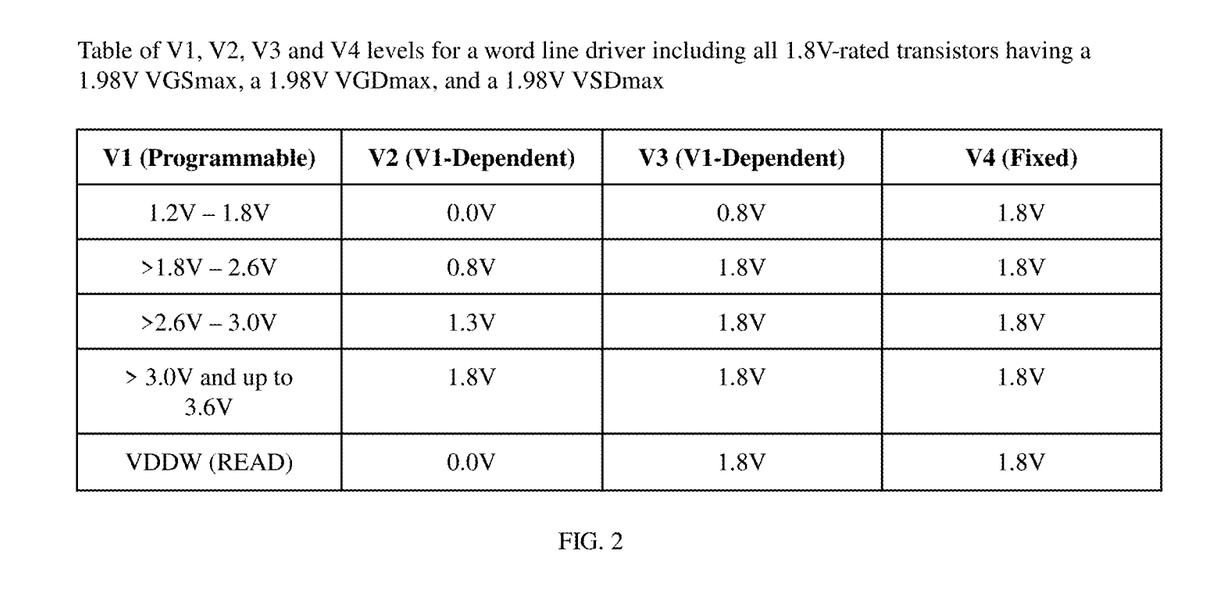
FIG. 2 is a table illustrating examples of different voltages employed during operation of the word line driver of FIG. 1.

FIG. 2 is a table illustrating examples of voltages levels that can be employed for the programmable first voltage (V1), the V1-dependent second voltage (V2), the V1-dependent third voltage (V3), and the fixed fourth voltage (V4) when all transistors 10, 20, 30, 40, 50 and 60 with word line driver 100 are 1.8V-rated transistors with a VGSmax of 1.98V, a VGDmax of 1.98V, and a VSDmax of 1.98V.

As indicated in the table of FIG. 2, programmable first voltage (V1) can be between a minimum voltage level, such as 1.2V, and a maximum voltage level, such as 3.6V. Optionally, voltage increases or decreases between the minimum and maximum voltage levels (e.g., between 1.2V and 3.6V) can be uniform (e.g., by 75 mV steps, by 100 mV steps, by 150 mV steps, etc.). Alternatively, such voltage increases or decreases can be non-uniform. V1 can, for example, be generated by a programmable voltage generator (e.g., a digital-to-analog converter (DAC)-controlled voltage generator, a charge pump that employs a trim code to set the voltage level, or any other suitable programmable voltage generator).

Additionally, as indicated in the table of FIG. 2, the V1-dependent second voltage (V2) can be lower than V1 and can increase as V1 increases. For example, if V1 is programmed to be within the range of 1.2V-1.8V, then V2 can be automatically set at 0.0V. If V1 is programmed to be within the range of over 1.8V to 2.6V, then V2 could be automatically set at 0.8V. If V1 is programmed to be within the range of over 2.6V to 3.0V, then V2 can be automatically set at 1.3V. If V1 is programmed to be within the range of over 3.0V to 3.6V, then V2 can be automatically set at 1.8V. Furthermore, the V1-dependent third voltage (V3) can also vary dependent upon V1. For example, if V1 is programmed to be within the range of 1.2V-1.8V, then V3 can be automatically set at 0.8V. If V1 is programmed to be within the range of over 1.8V to 3.6V, then V3 can be automatically set at 1.8V. V2 and V3 can specifically be generated by a pair of variable voltage generators, each configured to track V1 and to generate and output a V1-dependent voltage (V2 and V3, respectively) depending upon V1. In some embodiments, such tracking can be performed by the variable voltage generators using an external trim bit signal (TRIM) employed by the programmable voltage generator when programming V1. In other embodiments such tracking can be achieved by direct monitoring of V1. Finally, as indicated in the table of FIG. 2, V4 can be fixed at a specific voltage level regardless of V1, V2, or V3. For example, V4 can be set to be the same as the voltage rating of the transistors. For example, if 1.8V transistors are used, V4 can be 1.8V. V4 can, for example, be generated by a fixed voltage generator. Voltage generators as described above are known in the art and, thus, the details thereof have been omitted from the specification in order to allow the reader to focus on the salient aspects of the disclosed embodiments related to the word line driver structure and operation.

Operation of word line driver 100 is explained in greater detail below with respect to V1, V2, V3 and V4 as set forth in the table of FIG. 2.

Consider a read or write operation in which word line driver 100 is selected and V1 is programmed to its maximum voltage level of 3.6V, V2 is set at 1.8V, V3 is set at 1.8V and V4 is fixed at 1.8V (as indicated by the table of FIG. 2). Select signal 166 switches to ground to select the word line driver 100, second NFET 40 turns off and fourth PFET 60 turns on, so the voltage level on additional intermediate node 172 is pulled up to V4 (1.8V). Since source region 31 of first NFET 30 is at 1.8V and gate 33 of first NFET 30 is connected to receive the third power supply signal 163 at V3 (1.8V), first NFET 30 remains off. First power supply signal 161 is at V1 (3.6V) and input voltage signal 168 is at V2 (1.8V), so first PFET 10 turns on, pulling up the voltage on intermediate node 171 to V1 (3.6V). Source region 21 of second PFET 20 is connected to intermediate node 171 and gate 23 of second PFET 20 is connected to second power supply node 192 at V2 (1.8V), so second PFET 20 also turns on, thereby pulling up the voltage of the word line voltage signal 169 on word line voltage output node 199 to V1 (3.6V). Third PFET 50 has a source region 51 connected to second power supply node 192 at V2 (1.8V) and a gate 53 connected to word line voltage output node 199 at V1 (3.6V), so third PFET 50 remains off. Thus, when word line voltage signal 169 is at its maximum voltage level (in this case at 3.6V), there are no SOA violations in the transistors.

When select signal 166 switches back to V4 (1.8V), second NFET 40 turns on and fourth PFET 60 turns off so the voltage level on additional intermediate node 172 is pulled down to ground. Since source region 31 of first NFET 30 is at ground and gate 33 of first NFET 30 is connected to receive third power supply signal 163 at V3 (1.8V), first NFET 30 turns on, pulling the voltage level of the word line voltage signal 169 at word line voltage output node 199 back down to ground. First power supply signal 161 at first power supply node 191 switches to V2 (1.8V) and input voltage signal 168 at input voltage node 198 switches to V1 (3.6V), so first PFET 10 turns off. Second power supply signal 162 remains steady at V2 (1.8V) but word line voltage signal 169 on gate 53 of third PFET 50 has switched to ground, so third PFET 50 turns on and the voltage level on intermediate node 171 switches from V1 to V2. Since source region 21 of second PFET 20 is connected to intermediate node 171 at V2 (1.8V) and gate 23 of second PFET 20 is connected to receive second power supply signal 162 at V2 (1.8V), second PFET 20 turns off. Again, there are no SOA violations in the transistors.

Consider a read or write operation in which word line driver 100 is selected and V1 is programmed to its minimum voltage level of 1.2V, V2 is set at 0.0V, V3 is set at 0.8V and V4 is still fixed at 1.8V (as indicated by the table of FIG. 2). Select signal 166 switches to ground, second NFET 40 turns off and fourth PFET 60 turns on so the voltage level on additional intermediate node 172 is pulled up to V4 (1.8V). Source region 31 of first NFET 30 is at 1.8V and gate 33 of first NFET 30 is connected to receive V3 (0.8V), so first NFET 30 remains off. First power supply signal 161 is first power supply node 191 is at V1 (1.2V) and input voltage signal 168 at input voltage node 198 is at V2 (0.0V), so first PFET 10 turns on, pulling up the voltage on intermediate node 171 to V1 (1.2V). Source region 21 of second PFET 20 is connected to intermediate node 171 so as to receive V1 (1.2V) and gate 23 of second PFET 20 is connected to second power supply node 192 so as to receive second power supply signal 162 at V2 (0.0V), so second PFET 20 also turns on, pulling up the word line voltage signal 169 on word line voltage output node 199 to V1 (1.2V). Third PFET 50 has a source region 51 connected to second power supply node 192 at V2 (0.0V), and a gate 53 connected to word line voltage output node 199 at V1 (1.2V), so third PFET 50 remains off. Thus, when word line voltage signal 169 is at its minimum voltage level (in this case at 1.2V), there are no SOA violations in the transistors.

When select signal 166 switches back to V4 (1.8V), second NFET 40 turns on and fourth PFET 60 turns off, so the voltage level on additional intermediate node 172 is pulled down to ground. Since source region 31 of first NFET 30 is at ground and gate 33 of first NFET 30 is connected to receive the third power supply voltage 163 at V3 (0.8V), first NFET 30 turns on pulling the word line voltage signal 169 at word line voltage output node 199 back down to ground. First power supply signal 161 at first power supply node 191 switches to V2 (0.0V) and input voltage signal 168 at input voltage node 198 switches to V1 (1.2V), so first PFET 10 turns off. Second power supply signal 162 remains steady at V2 (0.0V) but word line voltage signal 169 on gate 53 of third PFET 50 has switched to ground, so third PFET 50 stays off and intermediate node 171 is left floating. Since source region 21 of second PFET 20 is connected to intermediate node 171 (which is floating) and gate 23 of second PFET 20 is connected to receive second power supply signal 162 at V2 (0.0V), second PFET 20 turns off. Again, there are no SOA violations in the transistors.

Consider a read or write operation in which word line driver 100 is selected and V1 is programmed to some intermediate voltage level of, for example, 2.0V, V2 is set at 0.8V, V3 is set at 1.8V and V4 is fixed at 1.8V (as indicated by the table of FIG. 2). Select signal 166 switches to ground, second NFET 40 turns off and fourth PFET 60 turns on so the voltage level on additional intermediate node 172 is pulled up to V4 (1.8V). Since source region 31 of first NFET 30 is at 1.8V and gate 33 of first NFET 30 is connected to receive the third power supply signal 163 at V3 (1.8V), first NFET 30 remains off. First power supply signal 161 at first power supply node 191, is at V1 (2.0V) and input voltage signal 168 at input voltage node 198 is at V2 (0.8V), so first PFET 10 turns on, pulling up the voltage on intermediate node 171 to V1 (2.0V). Source region 21 of second PFET 20 is connected to intermediate node 171 and gate 23 of second PFET 20 is connected to second power supply node 192 at V2 (0.8V), so second PFET 20 also turns on, thereby pulling up the word line voltage signal 169 at word line voltage output node 199 to V1 (2.0V). Third PFET 50 has a source region 51 connected to second power supply node 192 at V2 (0.8V) and a gate 53 connected to word line voltage output node 199 at V1 (2.0V), so third PFET 50 remains off. Thus, when word line voltage signal 169 is at its maximum voltage level (in this case at 2.0V), there are no SOA violations in the transistors.

When select signal 166 switches back to V4 (1.8V), second NFET 40 turns on and fourth PFET 60 turns off so the voltage level on additional intermediate node 172 is pulled down to ground. Since source region 31 of first NFET 30 is at ground and gate 33 of first NFET 30 is connected to receive the third power supply signal 163 at V3 (1.8V), first NFET 30 turns on pulling the word line voltage signal 169 at word line voltage output node 199 back down to ground. First power supply signal 161 at first power supply node 191 switches to V2 (0.8V) and input voltage signal 168 at input voltage node 198 switches to V1 (2.0V), so first PFET 10 turns off. Second power supply signal 162 remains steady at V2 (0.8V) but word line voltage signal 169 on gate of third PFET 50 has switched to ground, so third PFET 50 turns on and the voltage level on intermediate node 171 switches from V1 to V2. Since the source region 21 of second PFET 20 is connected to intermediate node 171 at V2 (0.8V) and gate 23 of second PFET 20 is connected to receive second power supply signal 162 at V2 (0.8V), second PFET 20 turns off. Again, there are no SOA violations in the transistors.

Figure 3:
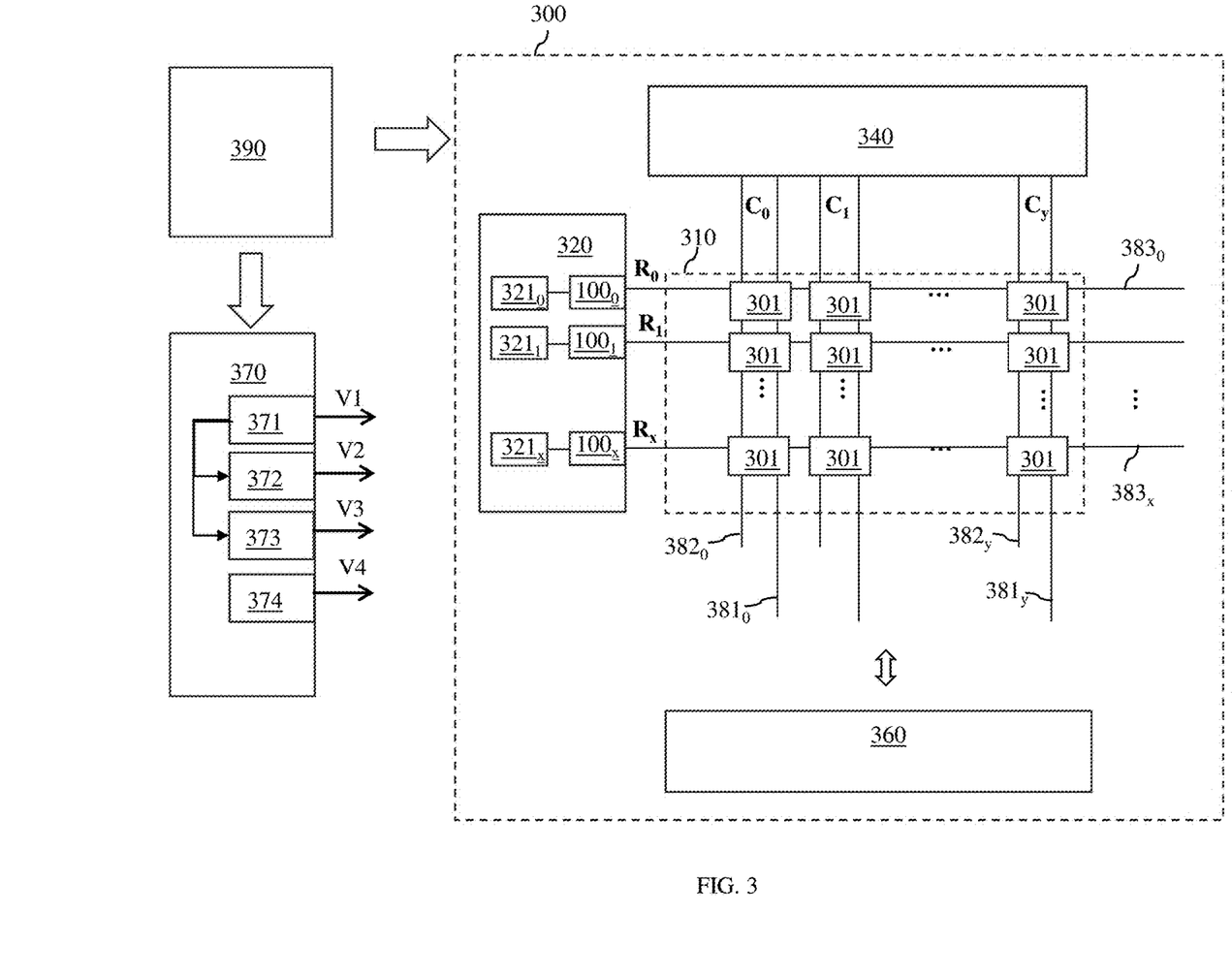
FIG. 3 is schematic diagram illustrating an embodiment of a memory device including peripheral circuitry that incorporates multiple instances of the word line driver of FIG. 1.

Also disclosed herein are embodiments of a memory device that includes peripheral circuitry with multiple instances of the word line driver 100 of FIG. 1. Specifically, FIG. 3 is a schematic diagram illustrating an embodiment of a resistive random-access memory (RRAM) device 300 that includes multiple instances of the word line driver (e.g., see word line drivers $100_0$-$100_x$) incorporated into its peripheral circuitry for outputting word line voltage signals with programmable high voltage levels.

RRAM device 300 can include an array of RRAM cells 301 arranged in columns (C0-Cy) and rows (R0-Rx). Each RRAM cell 301 in a column can be connected to a corresponding bit line-source line pair for that column (see bit lines $381_0$-$381_y$ and source lines $382_0$-$382_y$). Each RRAM cell 301 in a row can be connected to a corresponding word line for the row (see word lines $383_0$-$383_x$).

Figure 4:
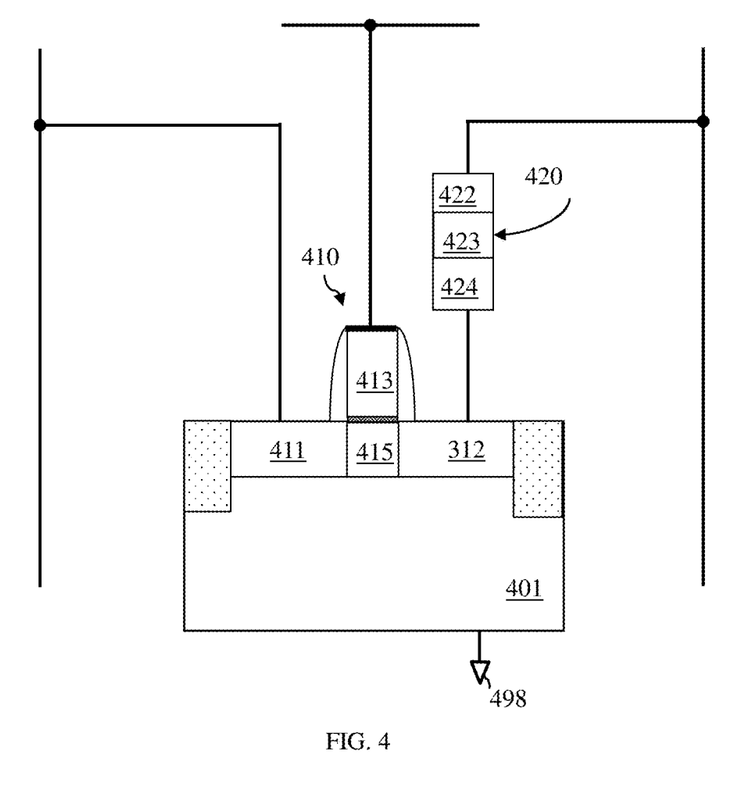
FIG. 4 is a cross-section diagram illustrating one example of a memory cell that can be incorporated into the memory device of FIG. 3.

FIG. 4 is a cross-section diagram illustrating one example of an RRAM cell 301 that can be incorporated into the array 310 of RRAM device 300. RRAM cell 301 can, for example, include a programmable resistor 420 and an access transistor 410 (e.g., an N-type field effect transistor (NFET)) connected in series between a bit line-source line pair. Programmable resistor 420 could be a back end of the line (BEOL) multi-layer structure, which includes two different metal layers 422 and 424 separated by a dielectric layer 423 (e.g., hafnium oxide or some other suitable oxide layer, also referred to as a switching layer). Metal layer 422 can be connected to a bit line. Access transistor 410 could include N-type source/drain regions 411-412, which are connected to a source line and metal layer 424, respectively. Access transistor 410 could further include: a P- or intrinsic channel region 415 between N-type source/drain regions 411-412; and a gate 413 adjacent to channel region 415. Gate 413 of access transistor 410 can be connected to a word line and a body 401 of access transistor can be connected to ground.

In operation, when the word line voltage signal on the word line connected to the RRAM cell switches to a relatively high positive voltage level, access transistor 410 turns on. During a write operation when access transistor 410 turns on, ions in dielectric layer 423 may (as a function of biasing voltages applied to the bit line, source line, and word line), migrate to: (a) either break-up a conductive filament between metal layers 422 and 424 so that the programmable resistor 420 is in a high resistance state, thereby storing one logic value (referred to as a reset process), or (b) grow a conductive filament within dielectric layer 423 between metal layers 422 and 424 so that programmable resistor 420 is in a low resistance state or, more particularly, in one of multiple possible low resistance states, thereby storing a different logic value (referred to as a set process). During the reset process, the high voltage level of the word line voltage signal can be programmed to facilitate reset of programmable resistor 420 to its maximum resistance state. During the set process, the high voltage level of the word line voltage signal can be programmed to some lower level to achieve any one of multiple possible resistance states below the maximum resistance state.

RRAM device 300 can further include a controller 390, a power supply system 370 in communication with controller 390, and other peripheral circuitry, which is in communication with controller 390 and power supply system 370, which is connected to the bit lines, source lines, and word lines, and which is configured to facilitate performance of write operations and read operations in selected cells 301 within the array 310 in response to control signals from controller 390 and power supply voltages from the power supply system.

Power supply system 370 can be configured to generate and output multiple voltages to corresponding voltage rails to facilitate memory operations in response to control signals from controller 390. Specifically, power supply system 370 can include multiple voltage generators including, but not limited to, voltage generators 371-374. Specifically, power supply system 370 can include a programmable voltage generator 371 configured to generate and output a first voltage at the programmable first voltage (V1). V1 can be programmed depending upon the operation to be performed (e.g., a write operation, such as a set or reset, or a read operation). Power supply system 370 can further include a pair of variable voltage generators 372 and 373. Variable voltage generators 372 and 373 can be configured to generate and output a second voltage and a third voltage at the V1-dependent second voltage (V2) and the V1-dependent third voltage (V3), respectively. That is, the variable voltage generators 372 and 373 can track V1 and output the second and third voltages based on V1. In some embodiments, such tracking can be performed by the variable voltage generators using an external trim bit signal (TRIM) employed by the programmable voltage generator when programming V1. In other embodiments such tracking can be achieved by direct monitoring of V1. A fixed voltage generator 374 can generate a fourth voltage at V4. Various programmable voltage generators (e.g., digital-to-analog converter (DAC)-controlled voltage generators), variable voltage generators, and fixed voltage generators are known in the art and, thus, the details thereof have been omitted from the specification in order to allow the reader to focus on the salient aspects of the disclosed embodiments related to the word line driver structure and operation.

The peripheral circuitry can also include, for example, a column decode block 340 electrically connected to source lines $382_0$-$382_y$ and bit lines $381_0$-$381_y$. Column decode block 340 can include, for example, drivers and other circuitry configured to control source line and bit line biasing in response to control signals from controller 390 during read and write operations. The peripheral circuitry can also include a sense circuit 360 electrically connected to the bit lines and configured to enable sensing of changes in bit line electrical properties (e.g., voltage or current) during read operations. Various different configurations for column decode blocks and sense circuits for memory devices, such as RRAM devices, are well known in the art and, thus, details thereof have been omitted from the specification in order to allow the reader to focus on thee salient aspects of the disclosed embodiments related to word line driver operation.

The peripheral circuitry can also include a row decode block 320. Row decode block 320 can include multiple instances of word line driver 100 of FIG. 1. That is, as illustrated in FIG. 3, row decode block 320 can include word line drivers $100_0$-$100_x$ with word line voltage output nodes connected to word lines $383_0$-$383_x$ for rows R0-Rx, respectively. Row decode block 320 can further include word line pre-drivers $321_0$-$321_x$ connected to word line drivers $100_0$-$100_x$, respectively, and configured to generate and output corresponding first power supply signals, input voltage signals and select signals thereto to facilitate word line driver operations discussed above with respect to FIGS. 1-2.

Figure 5:
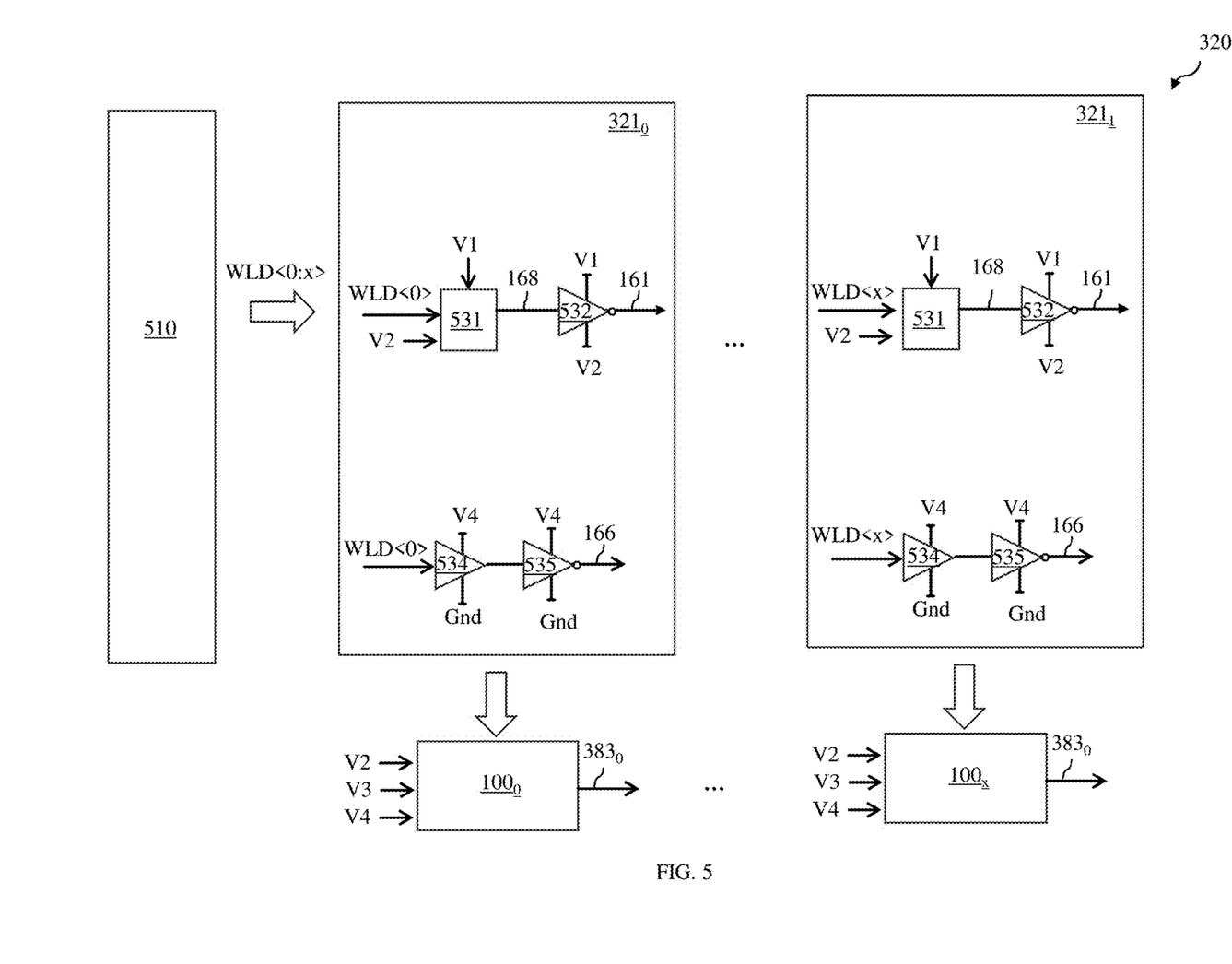
FIG. 5 is a schematic diagram illustrating one example of a row decode block that can be incorporated into the memory device of FIG. 3.

FIG. 5 is a schematic diagram illustrating, in greater detail, one example of a row decode block 320 that could be incorporated into RRAM device 300. Row decode block 320 can include a row address decoder 510, which receives and decodes row address signals and which outputs decoded row address signals (WLD<0:x>) to pre-drivers $321_0$-$321_x$, respectively. The decoded row address signal received by a pre-driver can indicate whether the word line driver connected to that pre-driver has been selected (e.g., if at a logic 1) or remains unselected (e.g., if at a logic 0).

The pre-drivers $321_0$-$321_x$ can be connected to voltage rails for receiving voltages (e.g., at V1, V2 and V4) from power supply system 370. Each pre-driver can further include circuitry for generating and outputting a corresponding set of signals (including first power supply signal 161, input voltage signal 168, and select signal 166) to a word line driver connected thereto depending upon the logic value of the received decoded row address signal. For example, each pre-driver $321_0$-$321_x$ could include a voltage level shifter 531 and an inverter 532 connected in series. Voltage level shifter 531 can be supplied with voltages at V1 and V2, can be connected to receive a corresponding decoded row address signal, and can be configured to generate input voltage signal 168 depending upon the logic level of the received decoded row address signal. For example, if the decoded row address signal is high (when word line driver selected), input voltage signal 168 can be at V2; whereas, if the decoded row address signal is low (when word line driver is not selected), input voltage signal 168 can be at V1. Inverter 532 can similarly be supplied with voltages at V1 and V2, can receive input voltage signal 168, and can be configured to generate first power supply signal 161 at V1 when input voltage signal 168 is at V2 and vice versa. Each pre-driver $321_0$-$321_x$ could further include a buffer 534 and an additional inverter 535 connected in series. Buffer 534 and additional inverter 535 can each be supplied with voltages at V4 and ground. Buffer 534 can also receive the decoded row address signal and can be configured to output a buffered signal at V4 when the decoded row address signal is a logic 1 and at ground when the decoded address signal is a logic 0. Additional inverter 535 can be connected to receive the buffered signal and can be configured to output select signal 166 at ground when buffer signal is at V4 and vice versa. Voltage level shifters, buffers, and inverters are well known in the art and thus the details thereof have been omitted from this specification in order to allow the reader to focus on the salient aspects of the disclosed embodiments related to word line driver structure and operation.

Each word line driver $100_0$-$100_x$ can be connected to receive signals 161, 166, and 168 at nodes 191, 196 and 198, respectively, from its pre-driver $321_0$-$321_x$ and can further be connected at nodes 192, 193, and 194 to voltage rails for receiving signals 162, 163, and 164 at V2, V3 and V4, respectively, from power supply system 370. As discussed in detail above with regard to FIG. 1, when a word line driver is selected, the word line voltage output signal on the word line connected to the word line driver will be at V1 (as programmed), whereas, when the word line driver is not selected, the word line voltage output signal will be at ground. In either case and regardless of V1 programming, SOA violations will be avoided.

It should be noted that the various features of RRAM device 300 described above and shown in FIGS. 3-5 are provided for illustration purposes and are not intended to be limiting. Alternatively, any other suitable configurations for the power supply system and/or peripheral circuitry in an RRAM device could be employed to generate voltages at V1, V2, V3 and V4 and to generate the various word line driver input signals, as discussed above. Alternatively, multiple instances of word line driver 100 of FIG. 1 could be incorporated into any other type of RRAM device or any other memory device requiring word line voltage signals with programmable high voltage levels.

It should be understood that in the method and structures described above, a semiconductor material refers to a material whose conducting properties can be altered by doping with an impurity. Exemplary semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped with a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region.

It should be understood that the terminology used herein is for the purpose of describing the disclosed structures and methods and is not intended to be limiting. For example, as used herein, the singular forms "a," "an," and "the" are intended to include the plural forms as well, unless the context clearly indicates otherwise. Additionally, as used herein, the terms "comprises," "comprising," "includes," and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right," "left," "vertical," "horizontal," "top," "bottom," "upper," "lower," "under," "below," "underlying," "over," "overlying," "parallel," "perpendicular," etc., are intended to describe relative locations as they are oriented and illustrated in the drawings (unless otherwise indicated) and terms such as "touching," "in direct contact," "abutting," "directly adjacent to," "immediately adjacent to," etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various disclosed embodiments have been presented for purposes of illustration but are not intended to be exhaustive or limiting. Many modifications and variations will be apparent to those of ordinary skill in the art without departing from the scope and spirit of the disclosed embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a group of series-connected transistors between a first power supply node and ground and including at least a first P-type transistor, a second P-type transistor, and a first N-type transistor;
an intermediate node between the first P-type transistor and the second P-type transistor;
a word line voltage output node between the second P-type transistor and the first N-type transistor; and
a third P-type transistor connected between a second power supply node and the intermediate node, wherein a gate of the third P-type transistor is connected to the word line voltage output node.

2. The structure of claim 1,
wherein the first power supply node is connected to receive a first power supply signal that switches between a first voltage that is programmable and a second voltage that is dependent on the first voltage,
wherein the second power supply node is connected to receive a second power supply signal at the second voltage,
wherein a gate of the first P-type transistor is connected to an input voltage node,
wherein the input voltage node is connected to receive an input signal that switches between the second voltage and the first voltage,
wherein a gate of the second P-type transistor is connected to the second power supply node, and
wherein the word line voltage output node outputs a word line voltage signal that switches between the first voltage and ground.

3. The structure of claim 2,
wherein a gate of the first N-type transistor is connected to a third power supply node, and
wherein the third power supply node is connected to receive a third power supply signal at a third voltage that is dependent on the first voltage.

4. The structure of claim 3,
wherein the group of series-connected transistors further includes a second N-type transistor connected between the first N-type transistor and ground, wherein the structure further comprises:
an additional intermediate node between the first N-type transistor and the second N-type transistor; and
a fourth P-type transistor connected between a fourth power supply node and the additional intermediate node, and
wherein the fourth power supply node is connected to receive a fourth power supply signal at a fourth voltage that is fixed.

5. The structure of claim 4, wherein gates of the second N-type transistor and the fourth P-type transistor are connected to a word line driver select node and wherein the word line driver select node is connected to receive a word line driver select signal that switches between ground and the fourth voltage.

6. The structure of claim 4, wherein the third P-type transistor and the fourth P-type transistor are smaller than the first P-type transistor and the second P-type transistor.

7. The structure of claim 4, wherein maximum operating voltage conditions for the first P-type transistor, the second P-type transistor, the third P-type transistor, the fourth P-type transistor, the first N-type transistor, and the second N-type transistor are the same.

8. The structure of claim 7, wherein, given the first power supply signal, the second power supply signal, the third power supply signal, the fourth power supply signal and the input signal, violations of the maximum operating voltage conditions are avoided when the first voltage is programmed to different voltage levels.

9. A structure comprising:
a group of series-connected transistors between a first power supply node and ground and including at least a first P-type transistor, a second P-type transistor, and a first N-type transistor;
an intermediate node between the first P-type transistor and the second P-type transistor;
a word line voltage output node between the second P-type transistor and the first N-type transistor; and
a third P-type transistor connected between a second power supply node and the intermediate node,
wherein a gate of the first P-type transistor is connected to an input voltage node,
wherein a gate of the second P-type transistor is connected to the second power supply node,
wherein a gate of the third P-type transistor is connected to the word line voltage output node,
wherein the first power supply node is connected to receive a first power supply signal that switches between a first voltage that is programmable and a second voltage that is dependent on and lower than the first voltage,
wherein the input voltage node is connected to receive an input signal that switches between the second voltage and the first voltage,
wherein the second power supply node is connected to receive a second power supply signal at the second voltage, and
wherein the word line voltage output node outputs a word line voltage signal that switches between the first voltage and ground.

10. The structure of claim 9,
wherein a gate of the first N-type transistor is connected to a third power supply node, and
wherein the third power supply node is connected to receive a third power supply signal at a third voltage that is dependent on and lower than the first voltage.

11. The structure of claim 10,
wherein the group of series-connected transistors further includes a second N-type transistor connected between the first N-type transistor and ground, and
wherein the structure further comprises:
an additional intermediate node between the first N-type transistor and the second N-type transistor; and
a fourth P-type transistor connected between a fourth power supply node and the additional intermediate node,
wherein gates of the second N-type transistor and the fourth P-type transistor are connected to a word line driver select node,
wherein the fourth power supply node is connected to receive a fourth power supply signal at fourth voltage that is fixed, and
wherein the word line driver select node is connected to receive a word line driver select signal that switches between ground and the fourth voltage.

12. The structure of claim 11, wherein the third P-type transistor and the fourth P-type transistor are smaller than the first P-type transistor and the second P-type transistor.

13. The structure of claim 11, wherein maximum operating voltage conditions for the first P-type transistor, the second P-type transistor, the third P-type transistor, the fourth P-type transistor, the first N-type transistor, and the second N-type transistor are the same.

14. The structure of claim 13, wherein, given the first power supply signal, the second power supply signal, the third power supply signal, the fourth power supply signal and the input signal, violations of the maximum operating voltage conditions are avoided when the first voltage is programmed to different voltage levels.

15. A structure comprising:
a memory array including rows of memory cells;
word lines connected to the rows, respectively; and
peripheral circuitry including word line drivers connected to the word lines, respectively, wherein each word line driver includes:
a group of series-connected transistors between a first power supply node and ground and including at least a first P-type transistor, a second P-type transistor, and a first N-type transistor;
an intermediate node between the first P-type transistor and the second P-type transistor;
a word line voltage output node between the second P-type transistor and the first N-type transistor and connected to a word line for a row; and
a third P-type transistor connected between a second power supply node and the intermediate node, wherein a gate of the third P-type transistors is connected to the word line voltage output node.

16. The structure of claim 15, further comprising a power supply system that generates and outputs multiple voltages including:
a first voltage that is programmable;
a second voltage that is lower than and dependent on the first voltage;
a third voltage that is lower than and dependent on the first voltage; and
a fourth voltage this is fixed,
wherein the peripheral circuitry further includes pre-drivers connected to receive the first voltage, the second voltage and the fourth voltage, and
wherein the pre-drivers generate and output first power signals that switch between the first voltage and the second voltage, input signals that switch between the second voltage and the first voltage, and word line driver select signals that switch between ground and the fourth voltage.

17. The structure of claim 16, wherein, within each word line driver:
the first power supply node is connected to receive a first power supply signal from a pre-driver,
the second power supply node is connected to receive a second power supply signal at the second voltage from the power supply system,
a gate of the first P-type transistor is connected to an input voltage node to receive an input signal from the pre-driver,
a gate of the second P-type transistor is connected to the second power supply node, and
the word line voltage output node outputs a word line voltage signal that switches between the first voltage and ground.

18. The structure of claim 17, wherein, within each word line driver:
a gate of the first N-type transistor is connected to a third power supply node, and
the third power supply node is connected to receive a third power supply signal at the third voltage from the power supply system.

19. The structure of claim 18, wherein, within each word line driver:
the group of series-connected transistors further includes a second N-type transistor connected between the first N-type transistor and ground,
an additional intermediate node is between the first N-type transistor and the second N-type transistor,
a fourth P-type transistor is connected between a fourth power supply node and the additional intermediate node, and
the fourth power supply node is connected to receive a fourth power supply signal at a fourth voltage from the power supply system.

20. The structure of claim 19, wherein, within each word line driver, gates of the second N-type transistor and the fourth P-type transistor are connected to a word line driver select node and wherein the word line driver select node is connected to receive a word line driver select signal from the pre-driver.

* * * * *